(12) United States Patent
Li et al.

(10) Patent No.: US 7,970,977 B1
(45) Date of Patent: Jun. 28, 2011

(54) DEADLOCK-RESISTANT BUS BRIDGE WITH PIPELINE-RESTRICTED ADDRESS RANGES

(75) Inventors: Kam-Wing Li, San Jose, CA (US);
Ahmad R. Ansari, San Jose, CA (US);
Sanford L. Helton, San Jose, CA (US);
Tomai Knopp, Rio Rancho, CA (US);
Khang Kim Dao, San Jose, CA (US);
Jeffrey H. Seltzer, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 113 days.

(21) Appl. No.: 12/363,610

(22) Filed: Jan. 30, 2009

(51) Int. Cl.
*G06F 13/36* (2006.01)
*G06F 3/00* (2006.01)
*G06F 5/00* (2006.01)
*G06F 9/26* (2006.01)

(52) U.S. Cl. ............ 710/310; 710/9; 710/39; 710/306; 710/311; 710/4; 711/200; 711/202

(58) Field of Classification Search .................. 710/306, 710/310, 311, 9; 711/200, 202
See application file for complete search history.

(56) References Cited

U.S. PATENT DOCUMENTS

| 5,961,623 | A  | * | 10/1999 | James et al. ................... 710/113 |
| 6,418,503 | B1 | * | 7/2002  | Moertl et al. .................. 710/310 |
| 6,880,035 | B1 | * | 4/2005  | Groeger et al. ............... 710/308 |
| 6,901,451 | B1 | * | 5/2005  | Miyoshi et al. ............... 709/232 |
| 7,035,958 | B2 | * | 4/2006  | Augsburg et al. ............. 710/310 |
| 7,315,912 | B2 | * | 1/2008  | Reed ............................. 710/310 |
| 7,412,555 | B2 | * | 8/2008  | Wang ............................ 710/310 |
| 7,469,309 | B1 | * | 12/2008 | Duncan et al. ................ 710/240 |
| 7,694,025 | B1 | * | 4/2010  | Norrie .............................. 710/3 |

* cited by examiner

*Primary Examiner* — Brian T Misiura
(74) *Attorney, Agent, or Firm* — Kevin T. Cuenot (57) ABSTRACT

A method of bridging a plurality of buses within a bus bridge can include determining whether a queue of the bus bridge includes a transaction request directed to a restricted address range and, for each received transaction request, determining whether an address to which the transaction request is directed is within the restricted address range. Each transaction request received by the bus bridge can be selectively rejected according to whether the address to which the transaction request is directed is within the restricted address range and whether the queue includes a transaction request directed to the restricted address range.

18 Claims, 5 Drawing Sheets

DEADLOCK-RESISTANT BUS BRIDGE WITH PIPELINE-RESTRICTED ADDRESS RANGES

FIELD OF THE INVENTION

The embodiments disclosed herein relate to integrated circuit devices (ICs). More particularly, one or more embodiments relate to a deadlock-resistant bus bridge that can be implemented within an IC.

BACKGROUND

A bus is an interconnect subsystem, or circuit, that transfers data between different devices within an electronic circuit. To ensure problem free operation, each bus defines its own set of rules and connections that must be observed by each device connected to the bus. Examples of devices that may be connected to a bus can include, but are not limited to, processors, memories, bridges to external systems, and the like. Unlike a point-to-point connection, a bus can logically connect several peripherals over the same set of wires.

Many electronic systems utilize multiple buses to facilitate data transfer among multiple devices in parallel. When using multiple buses within a single system, it may be necessary to include a mechanism such as a bus bridge or a cross bar to allow data to pass from one bus to another bus. Bus bridges and crossbars, in general, are inter-bus relay mechanisms that facilitate higher throughput than would otherwise be attained.

The rules implemented by each bus of a system ensure that each respective bus functions properly on an individual basis. These same rules, however, can be problematic in an environment where a plurality of buses are coupled through a bus bridge. Situations may arise in which a bus bridge, for example, when trying to allow data to pass from one bus to another, experiences a deadlock condition. A deadlock condition typically arises when implementation of the rules of one bus connected to the bus bridge interfere with implementation of the rules of another bus connected to the bus bridge. The bus bridge becomes deadlocked, preventing any further data from passing from one bus to another.

SUMMARY

One or more embodiments disclosed within this specification relate to integrated circuit devices (ICs) and, more particularly, to a deadlock-resistant bus bridge that can be implemented within an IC. One embodiment of the present invention can include a method of bridging a plurality of buses using a bus bridge. The method can include determining whether a queue of the bus bridge includes a transaction request directed to a restricted address range and, for each received transaction request, determining whether an address to which the transaction request is directed is within the restricted address range. Each transaction request received by the bus bridge can be selectively rejected according to whether the address to which the transaction request is directed is within the restricted address range and whether the queue includes a transaction request directed to the restricted address range.

The method can include, responsive to issuing a transaction request from the bus bridge directed to an address within the restricted address range, reordering the transaction request within the queue if and when the transaction request is rejected.

Selectively rejecting each transaction request received by the bus bridge can include storing the transaction request in the queue when the address to which the received transaction request is not within the restricted address range and storing the transaction request in the queue when the queue does not include a transaction request directed to the restricted address range. Selectively rejecting each transaction request received by the bus bridge further can include rejecting the transaction request when the address to which the transaction request is directed is within the restricted address range and the queue includes a transaction request directed to the restricted address range. Selectively rejecting each transaction request received by the bus bridge further can include responding to the originator of the transaction request and instructing the originator to re-attempt the transaction request at a later time.

Responsive to issuing a transaction request that is not directed to an address within the restricted address range and that is rejected, the method can include continuing to attempt to issue the transaction request, wherein the transaction request is maintained within the queue while ordering of transaction requests is preserved.

Selectively rejecting each transaction request received by the bus bridge can include selectively rejecting each transaction request according to identity of the master that issued the transaction request. Selectively rejecting each transaction request received by the bus bridge also can include selectively rejecting each transaction request according to type of transaction request.

Another embodiment of the present invention can include a bus bridge. The bus bridge can include a queue storing transaction requests and a pipeline controller indicating whether the queue includes a transaction request directed to a restricted address range and determining, for each received transaction request, whether an address to which the transaction request is directed is within the restricted address range. The bus bridge can include at least one slave interface selectively rejecting each transaction request received by the bus bridge according to whether the address to which the transaction request is directed is within the restricted address range and whether the queue includes a transaction request directed to the restricted address range.

The bus bridge can be implemented so that the transaction request is maintained in the queue and at least one other transaction request can be placed ahead of the transaction request when the transaction request is rejected when issued from the bus bridge.

The slave interface(s) can store the transaction request in the queue when the address to which the received transaction request is not within the restricted address range and can store the transaction request in the queue when the queue does not include a transaction request directed to the restricted address range. The slave interface(s) can reject the transaction request when the address to which the transaction request is directed is within the restricted address range and the queue includes a transaction request directed to the restricted address range.

The bus bridge can include a master interface that, responsive to attempting to issue a transaction request that is not directed to an address within the restricted address range and that is rejected, continues to attempt to issue the transaction request. The transaction request can be maintained within the queue while ordering of transaction requests stored within the queue is preserved.

The slave interface(s) can selectively reject each transaction request according to identity of the master that issued the transaction request. Additionally, the slave interface(s) can selectively reject each transaction request according to type of the transaction request.

Yet another embodiment of the present invention can include a computer program product including a computer-usable medium having computer-usable program code that, when executed by a computer, implements a bus bridge for a programmable integrated circuit. The computer-usable medium includes computer-usable program code that implements a queue storing transaction requests. The medium further includes computer-usable program code that implements a pipeline controller indicating whether the queue comprises a transaction request directed to a restricted address range and determining, for each received transaction request, whether an address to which the transaction request is directed is within the restricted address range. In addition, the medium includes computer-usable program code that implements at least one slave interface selectively rejecting each transaction request received by the bus bridge according to whether the address to which the transaction request is directed is within the restricted address range and whether the queue comprises a transaction request directed to the restricted address range.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

One or more embodiments disclosed within this specification relate to integrated circuit devices (ICs) and, more particularly, to implementing a bus bridge within an IC that is resistant to deadlock conditions. In general, a deadlock condition refers to a situation, e.g., in which transaction processing within the bus bridge halts due to a conflict that arises among the transaction ordering rules used by the different buses that are interconnected by the bus bridge, or the transaction ordering rules of one or more peripheral devices connected to such buses. In accordance with one or more embodiments disclosed herein, multiple buses of a digital, electronic system can be interconnected through a bus bridge that resists deadlock conditions.

One or more selected devices connected to buses that are interconnected by the bus bridge may have transaction ordering rules that, under certain circumstances, conflict with the transaction ordering rules that apply to one or more buses connected to the bus bridge in a manner that may lead to deadlock. In accordance with one or more embodiments described within this specification, the address ranges of such selected devices can be designated as part of a "restricted address range." The bus bridge can avoid deadlock conditions by selectively reordering transactions that are queued within the bus bridge in a manner that does not violate the transaction ordering rules of each bus connected to the bus bridge. For example, a blocked read transaction request can be reordered within the queue in selected situations.

In general, within this specification, the phrase "address range" can refer to, e.g., any technique or mechanism for determining a particular slave to which a transaction is to be sent. For example, an address range can refer to a memory mapped bus paradigm, where each slave corresponds to, or is determinable through, an address, an address range, or multiple ranges of addresses. Transactions can be routed to particular slaves depending upon whether the transaction address falls within the address range corresponding to a given slave. In another example, an address range can refer to a discrete slave address, referred to as a "chip-select" value. A discrete slave address can be used that is separate from the address within the slave. The examples of address ranges are provided for purposes of illustration and are not intended as limitations of the embodiments described. Other techniques or mechanisms for distinguishing one slave from another also may be used.

The word "restricted," as applied to an address or an address range, is intended to refer to an attribute of a slave that can be used to distinguish that slave from another slave. The term restricted, however, does not necessarily carry meaning in the context of security. The term restricted is intended to distinguish those slaves, from others, for which a concern regarding deadlock exists that relates to the manner in which transactions are queued and issued for that slave.

One way in which the reordering of transaction requests within the queue of the bus bridge can be guaranteed not to violate any transaction ordering rules of a connected bus or peripheral is by restricting entry of one or more than one particular transaction request into the queue of the bus bridge according to one or more criteria that can include whether the address to which the transaction request is directed is within the restricted address range. The term "pipelining," as used from time to time within this specification, can refer to the process of entering a transaction request, e.g., storing, into the queue of the bus bridge.

Figure 1:
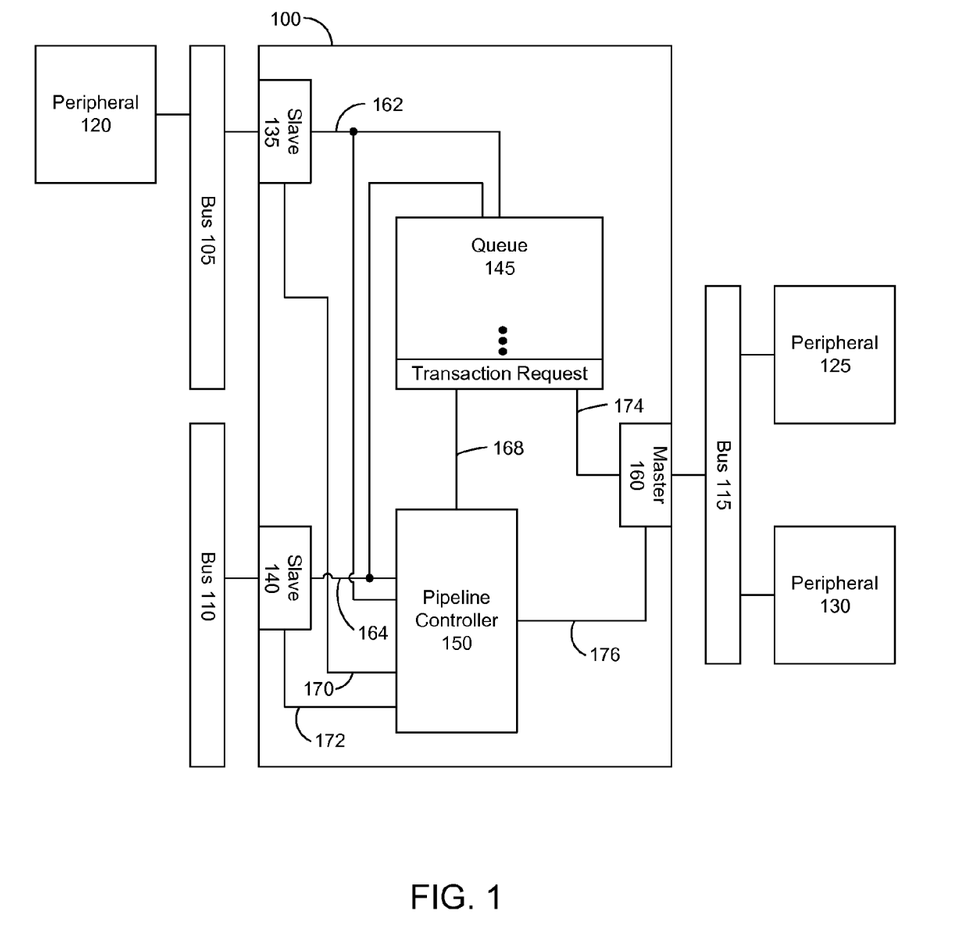
FIG. 1 is a first block diagram illustrating a bus bridge in accordance with one embodiment of the present invention.

FIG. 1 is a first block diagram illustrating a bus bridge 100 in accordance with one embodiment of the present invention. Bus bridge 100 can be disposed within an IC in which at least two buses are to be interconnected. In the example pictured in FIG. 1, bus bridge 100 interconnects buses 105, 110, and 115. Bus 105 can be coupled to peripheral 120. Bus 115 can be coupled to peripheral 125 and peripheral 130.

Bus bridge 100 can include a slave interface (slave) 135 and a slave 140. It should be appreciated that while two slaves are illustrated within bus bridge 100, the number of slaves shown is not intended to be a limitation of the embodiments described within this specification. For example, a bus bridge can be implemented with a single slave or with a plurality of slaves numbering more than two. In any case, each of slaves 135 and 140 can receive transaction requests via the bus coupled to that particular slave. Accordingly, slave 135 can receive transaction requests from a master, e.g., peripheral 120 or another device (not shown), on bus 105. Slave 140 can receive transaction requests from a master (not shown) on bus 110. Each of slaves 135 and 140 can selectively accept or reject each transaction request received according to one or more criteria. Rejecting a transaction request prevents that transaction request from entering a queue 145 disposed within bus bridge 100.

In one embodiment, each of slaves 135 and 140 can determine whether to accept or reject a transaction request received via bus 105 and/or 110 respectively according to the address to which the received transaction request is directed. Bus bridge 100 can maintain a restricted address range that can be stored within pipeline controller 150. When a transaction request is received via slave 135 or slave 140, the address to which the received transaction request is directed, e.g., the address of the transaction request, can be provided to pipeline controller 150 via signals 162 and 164.

Within this specification, the same reference characters are used to refer to terminals, signal lines, wires, and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between the two, or more, components connected by that signal or wire as the case may be.

Pipeline controller 150 can determine whether the address of the transaction request received by slave 135 or slave 140 is within the restricted address range, which can specify one or more restricted addresses, and, thus, is a restricted address. Pipeline controller 150 can specify the conditions under which a transaction request to a restricted address can be added to queue 145. In general, when queue 145 includes a transaction request to a restricted address, pipeline controller 150 can cause slaves 135 and 140 to reject any received transaction request also directed to a restricted address.

In this embodiment, the criteria used to accept or reject a received transaction request can depend upon the particular transaction ordering rules of the buses and/or peripherals connected by bus bridge 100. For example, pipeline controller 150 can selectively reject transaction requests according to the type of the transaction request, e.g., read or write, as well as the identity of the master that issued the transaction request. Further, the rejection of a received transaction request can be predicated upon the same or similar attributes of any transaction request stored within queue 145. For example, the identity of the master that issued a queued transaction request, the address to which the transaction request is directed, e.g., restricted or not, and the type of transaction request that is already stored within queue 145 also can be used to determine whether to accept or reject a given transaction request received by slave 135 and/or 140.

Pipeline controller 150 can maintain a flag that indicates when a transaction request that meets established criteria is stored within queue 145. For example, the flag can indicate when a transaction request with an address within the restricted address range is stored within the queue 145. As noted, the flag, however, can indicate the existence of other attributes of a queued transaction request, e.g., that the transaction request is not only directed to a restricted address, but also was issued from a particular master and/or is a write or read transaction request.

Accordingly, when slave 135 or slave 140 receives a transaction request, pipeline controller 150 can determine whether the transaction request corresponds to the criteria established for rejecting a transaction request. For example, when slave 135 and/or slave 140 receives a transaction request, pipeline controller 150 can determine whether the address of the transaction request is within the restricted address range. When the transaction request is directed to a restricted address, the state of the flag within the pipeline controller 150 can be checked. Pipeline controller 150 can determine the address of any transaction request received by slave 135 and/or slave 140 via signals 162 and 164 prior to the transaction request being stored in queue 145.

In this manner, pipeline controller 150 can monitor each transaction request that is accepted by slave 135 and slave 140 for storage within queue 145. When a transaction request is accepted within queue 145 that is directed to a restricted address range, the flag can be set within pipeline controller 150. As will be described in further detail, in some cases, the flag within the pipeline controller 150 can be set only when a particular type of transaction request, e.g., a read or a write, is received that is directed to a restricted address.

In general, transaction requests can be denied entry into queue 145 according to whether the address to which the transaction request is directed is within the restricted address range and the state of the flag within pipeline controller 150. In illustration, when a transaction request, e.g., a read transaction request, is accepted within queue 145 that is directed to an address within the restricted address range, the flag within the pipeline controller 150 can be set.

Pipeline controller 150, via control signals 170 and 172, can indicate to slave 135 and slave 140 respectively whether a received transaction request should be accepted. For example, when a received transaction request directed to an address within the restricted address range is received and the flag within pipeline controller 150 is set, indicating that another transaction request has already been accepted within queue 145 directed to the restricted address range, pipeline controller 150, via signal 170 and/or signal 172, will instruct slave 135 and/or slave 140 respectively to reject the received transaction request. For example, the particular slave that received the transaction request to be rejected can respond to the relevant arbitrator of the connected bus in a manner that would cause the rejected transaction to be re-attempted at some later time.

By controlling which transaction requests are permitted to enter queue 145, bus bridge 100 can ensure that when reordering of transaction requests within queue 145 is required to circumvent a deadlock condition, the reordering of one or more transaction requests within queue 145 does not violate the transaction ordering rules for any of buses 105-115, or any peripherals connected to buses 105-115.

Master 160 can obtain a transaction request from queue 145 through signal 174 that is the next transaction request to be dispatched, e.g., the transaction request pictured at the bottom portion of queue 145. Master 160 can issue that transaction request on bus 115. When bus 115 accepts the transaction request issued by master 160, that transaction request can be removed from queue 145 and output to bus 115. This may be the case regardless of whether the address to which the transaction request is directed is within the restricted address range.

When the transaction request that is accepted by bus 115 is directed to a restricted address range, the flag within pipeline controller 150 can be cleared to indicate that no further transaction requests to restricted addresses remain within queue 145. Clearing the flag allows a new transaction request directed to a restricted address range to be stored within queue 145 when received by slave 135 or slave 140. Pipeline controller 150 can monitor signal 168 to determine whether the transaction request at the bottom of queue 145 that is being presented to master 160 is directed to a restricted address range. Accordingly, pipeline controller 150 can determine from master 160, e.g., via signal 176, that a transaction request to a restricted address was accepted by bus 115 and is therefore to be removed from the queue 145. When the transaction request requested by master 160 is accepted by bus 115, as indicated by signal 176, and the transaction request is directed to a restricted address range, as indicated by signal 168, the flag within pipeline controller 150 can be cleared.

When bus 115 rejects the transaction request and the transaction request is not directed to an address within the restricted address range, the transaction request can remain within queue 145. The ordering of transaction requests within queue 145 can remain unchanged with the same transaction request remaining at the bottom of queue 145. Further, the state of the flag within pipeline controller 150 can remain unchanged. Master 160 will continue to attempt to issue the transaction request on bus 115.

When the rejected transaction request is directed to an address that is within the restricted address range, the rejected transaction request can be maintained within queue 145. The transaction request, however, can be moved to another location within queue 145. Queue 145 can include logic that can reorder the transaction requests stored therein as described within this specification. That is, the transaction requests within queue 145 can be reordered so that the rejected transaction request is no longer the next transaction request to be dispatched from queue 145, e.g., is no longer at the bottom of queue 145. In one embodiment, the rejected transaction request can be moved to the top of queue 145. When the transaction request directed to a restricted address is maintained within queue 145, the flag within pipeline controller 150 can remain set. Reordering a rejected transaction in this manner allows subsequently queued transaction request(s) to be issued by master 160 on bus 115. This, in turn, can resolve the condition that caused the transaction to be rejected, thereby allowing the reordered transaction to be accepted at some later time.

The embodiments illustrated with respect to FIG. 1 provide a bus bridge that allows one to specify particular addresses as restricted addresses. The peripherals having addresses designated as restricted, for example, can be those with transaction reordering rules. By preventing more than one transaction request, or more than one type of transaction request, e.g., either a read or a write, that is directed to a restricted address into queue 145 at any given time, transaction requests within queue 145 can be reordered without violating the transaction ordering rules of each of buses 105-115 coupled to bus bridge 100.

Figure 2:
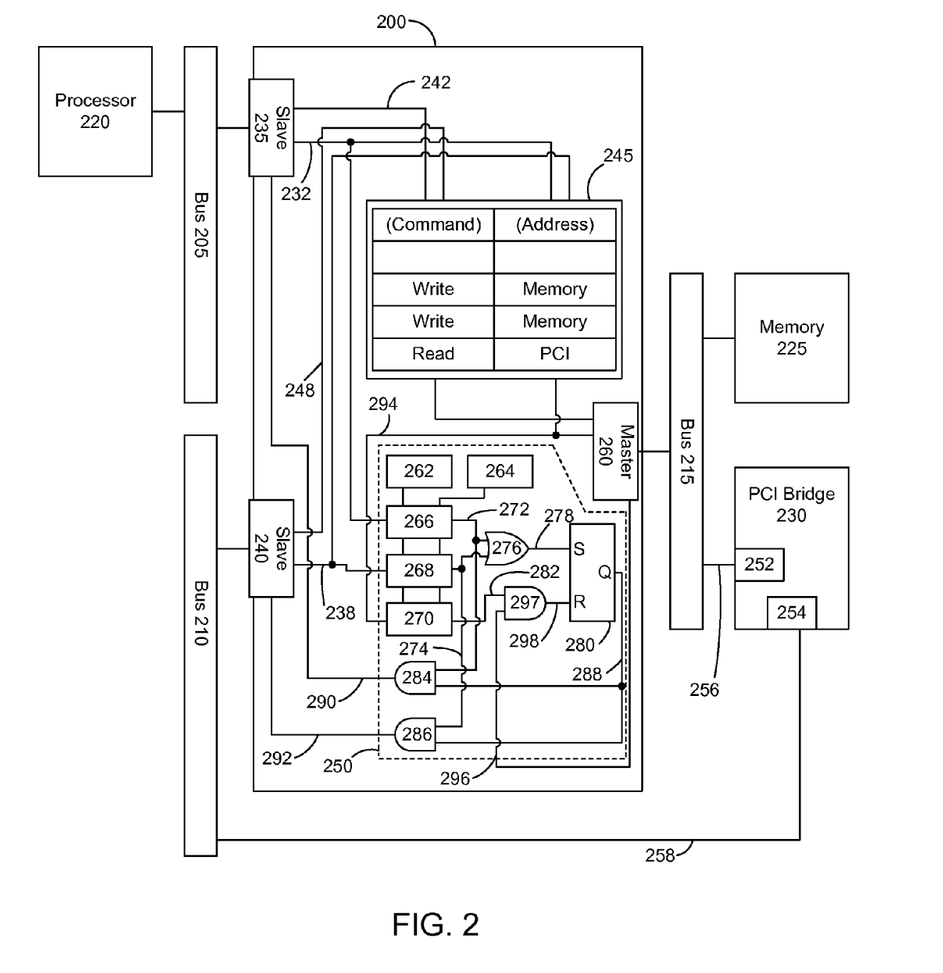
FIG. 2 is a second block diagram illustrating a bus bridge in accordance with another embodiment of the present invention.

FIG. 2 is a second block diagram illustrating a bus bridge 200 in accordance with another embodiment of the present invention. Bus bridge 200 includes slaves 235 and 240, a queue 245, a pipeline controller 250, and a master 260.

As pictured in FIG. 2, slave 235 can be coupled to bus 205. Slave 240 can be coupled to bus 210. Master 260 can be coupled to bus 215. In terms of peripheral devices that can be interconnected through bus bridge 200, a processor 220 can be coupled to slave 235 through bus 205. A memory 225 and a Peripheral Component Interconnect (PCI) bridge 230 can be coupled to master 260 via bus 215. It should be appreciated that the different peripheral devices illustrated in FIG. 2 are shown for purposes of illustration only and, as such, are not intended to limit the embodiments described.

In the example pictured in FIG. 2, PCI bridge 230 can be coupled to a PCI bus (not shown). The PCI bus may be located external to the system. For example, the PCI bus may be located "off-chip" in that the PCI bus is not located in the same IC as bus bridge 200. Accordingly, PCI bridge 230, which is coupled to bus bridge 200 via bus 215, can function as an interface between bus 215 and the PCI bus itself.

In one embodiment, each of buses 205-215 can be implemented as a Processor Local Bus (PLB). A PLB supports read and write data transfers between master and slave devices equipped with a PLB bus interface and connected through PLB signals. The PLB architecture supports multiple master and slave devices. Each PLB master can be attached to the PLB through a separate address and separate read-data and write-data buses. PLB slaves can be attached to the PLB through shared, but decoupled, address, read-data, and write-data buses and a plurality of transfer control and status signals for each data bus. Access to the PLB is granted through a central arbitration mechanism that allows masters to compete for bus ownership.

PLBs are used within this specification as example buses to better illustrate various aspects of one or more embodiments described. It should be appreciated, however, that one or more embodiments described within this specification can be applied to any of a variety of situations in which a bus bridge interconnects a plurality of buses that have transaction ordering rules. Accordingly, the embodiments are not intended to be limited solely to use with PLBs, with PCI bridges, or PCI buses for that matter.

In some situations, the different transaction ordering rules for interconnected buses can result in a conflict that, if left unattended, results in a deadlock condition that blocks data flow through bus bridge 200. For example, each PLB bus can have an ordering requirement that when there are multiple read and write transactions outstanding, and addresses to which the reads and writes are directed overlap, the transaction requests may not be issued out of order. Issuing the transaction requests out of order can result in reading data prematurely or reading stale data, both resulting in obtaining incorrect data as a consequence of the reordering of transaction requests.

PCI bridge 230 can have its own set of transaction ordering rules that are independent of the transaction ordering rules of any PLB. For example, one such rule is that if PCI bridge 230 has issued a write transaction request that is outstanding, e.g., incomplete and pending within bus bridge 200, PCI bridge 230 must reject any read transaction request that may be received until the outstanding write transaction request is completed. PCI bridge 230, for example, will issue a re-arbitrate signal through bus 215. When the write transaction request is completed, PCI bridge 230 can accept the read transaction request. PCI bridge 230, however, is not permitted to reorder pending write transactions to complete after the subsequently received read transaction.

Continuing with FIG. 2, PCI bridge 230 can have a PCI slave 252 coupled to bus 215 via signal 256 and a PCI master 254 coupled to bus 210 via signal 258. PCI slave 252 connected to signal 256 can process outbound transactions from the perspective of bus bridge 200. PCI master 254 connected to signal 258 can process inbound transactions. Consider the case where PCI master 254 requests access through bus 210 and bus bridge 200 to a device, such as a memory 225 on bus 215 to resolve a posted write transaction request. Concurrently, processor 220 issues a read transaction request through bus 205, through bus bridge 200 and bus 215, to PCI slave 252 directed to a remote device (not shown) coupled to PCI bridge 230. PCI slave 252 may deny the read transaction request from processor 220 until the posted write transaction request from PCI master 254 completes. PCI master 254, however, will not be able to gain access to bus 215 via bus bridge 200 while the read transaction request to PCI slave 252 is pending at master 260 of bus bridge 200.

Bus bridge 200, if unable to reorder transaction requests within queue 245, will continue to attempt to issue the read transaction request to PCI slave 252. PCI bridge 230, being unable to reorder transaction requests, will continue to deny the read transaction request. PCI bridge 230 continues to reject the read transaction request while the write transaction request is still pending. The write transaction request, however, is "stuck" in queue 245 awaiting successful dispatch of the read transaction request from queue 245.

In order to avoid this deadlock condition, bus bridge 200 must reorder the transaction requests in queue 245 so that the read transaction request from processor 220 to PCI bridge 230 is behind, e.g., will be dispatched after, the write transaction request from PCI bridge 230. As noted, reordering the transaction requests within queue 245 may be performed only if no transaction ordering rule of any bus, or device connected to a bus, that is connected to bus bridge 200 is violated. In this case, the transaction requests can be reordered if the ordering among pipelined transaction requests, in reference to transaction requests stored in queue 245, from the same masters is preserved. When a bus bridge is designed to preserve the ordering among all queued transactions, however, the deadlock situation described above may occur.

Within the example pictured in FIG. 2, selected addresses of devices connected to buses that are interconnected by bus bridge 200 can be designated as restricted addresses. For purpose of illustration, it can be assumed that the addresses corresponding to PCI slave 252 of PCI bridge 230 can be designated as a restricted address, e.g., an address that is within a restricted address range. As described with reference to FIG. 1, transaction requests received at slave 235 and/or slave 240 can be selectively denied entry into queue 245 of bus bridge 200, at least in part, according to whether the address to which the transaction request is directed is within the restricted address range. It should be appreciated that each device or peripheral can be independently designated as restricted. For example, PCI slave 252 can be assigned an address within the restricted address range while memory 225 may be assigned addresses outside of the restricted address range.

Pipeline controller 250 can include a first memory 262 storing an address that is the lower bound of the restricted address range. A second memory 264 can store an address that is the upper bound of the restricted address range. Pipeline controller 250 also can include a plurality of comparators 266, 268, and 270. Comparator 266 can obtain the address to which a transaction request received by slave 235 is directed via signal 232. Comparator 266 can compare the address to which received transactions from slave 235 are directed and output a signal 272 to OR gate 276 indicating whether the address is within the restricted address range. Similarly, comparator 268 can obtain the address to which a transaction request received by slave 240 is directed via signal 238. Comparator 268 can compare the address to which received transactions from slave 240 are directed and output a signal 274 to OR gate 276 indicating whether the address is within the restricted address range.

Accordingly, when either signal 272 or signal 274 indicates that the transaction request received at slave 235 or slave 240 respectively is within the restricted address range, OR gate 276 will output signal 278 to the set port of a flip-flop 280. Flip-flop 280 can implement the flag functionality of pipeline controller 250 that was described with reference to FIG. 1. As such, flip-flop 280 can be set to indicate when a transaction request directed to an address within the restricted address range specified by memories 262 and 264 has entered queue 245.

Comparator 270 can obtain the address for a transaction request at the bottom of queue 245 via signal 294. The transaction request at the bottom of queue 245 is the next transaction request to be issued from master 260 to bus 215. Pipeline controller 250 can determine when a transaction request being requested by master 260 is successfully accepted by bus 215 via signal 296. When a transaction request directed to an address within the restricted address range, as determined by comparator 270 and indicated by signal 282, has been successfully issued from master 260 to bus 215, as indicated by signal 296, e.g., not rejected by bus 215, an AND gate 297 can output signal 298 to the reset port of flip-flop 280 to clear the state of flip-flop 280. Resetting flip-flop 280 clears the flag of pipeline controller 250 and indicates that the queue no longer includes any transaction requests directed to a restricted address, e.g., PCI slave 252.

As pictured, the output of flip-flop 280 is coupled to the input of AND gate 284 and AND gate 286 via signal 288. The other input to AND gate 284 is taken from the output of comparator 266, e.g., signal 272. The other input to AND gate 286 is taken from the output of comparator 268, e.g., signal 274. Accordingly, when comparator 266 indicates that the address to which a transaction request received in slave 235 is within the restricted address range and flip-flop 280 is set, AND gate 284 can output signal 290 to slave 235 which causes slave 235 to reject the received transaction request. For example, responsive to signal 290, slave 235 can assert a re-arbitrate signal. Similarly, when comparator 268 indicates that the address to which a transaction request received in slave 240 is within the restricted address range and the flip-flop 280 is set, AND gate 286 can output signal 292 to slave 240 which causes slave 240 to reject the received transaction request.

When signal 290 indicates that a transaction request received within slave 235 can enter queue 245, slave 235 can store the transaction request within queue 245. The command portion of the transaction request, indicative of transaction request type, can be stored via signal 242 and the address portion of the transaction request can be stored via signal 232. When signal 292 indicates that a transaction received within slave 240 can enter queue 245, slave 240 can store the transaction request within the queue 245. The command portion of the transaction request can be stored via signal 248 and the address portion of the transaction request can be stored via signal 238.

FIG. 2 illustrates a bus bridge 200 in which selected addresses can be tagged as being restricted addresses. In this example, each connected slave port of an external bridge, such as PCI bridge 230, and any other devices that can potentially cause deadlock by refusing read requests due to the order in which the request is originally presented, can be designated as restricted addresses. When the circuit design is compiled for implementation within an IC, those devices can be grouped or assigned to a particular restricted address range, e.g., contiguous addresses.

In operation, when a transaction request, such as a read transaction request, to a restricted address is stored within queue 245, flip-flop 280 can be set. When another transaction request is received by either slave 235 or slave 240 that is directed to a restricted address, signals 290 or 292, as the case may be, will prevent slave 235 or slave 240 respectively from allowing the received transaction request to enter queue 245. For example, slave 235, responsive to signal 290, can reject a transaction request by issuing a re-arbitrate signal to the arbiter of bus 205. Similarly, slave 240, responsive to signal 292, can reject a transaction request by issuing a re-arbitrate signal to the arbiter of bus 210.

When flip-flop 280 indicates that queue 245 no longer includes a read transaction request directed to a restricted address, signals 290 and/or 292 respectively will allow slave 235 and/or slave 240 to store the received transaction request within queue 245. In this embodiment, when a transaction request is received by either slave 235 or slave 240 that is not directed to a restricted address, the transaction request can be stored within queue 245.

As noted, the type of transaction request can influence when transaction requests are reordered and accepted into queue 245. In one embodiment, when a read transaction request directed to a restricted address, e.g., PCI slave 252, is stored within queue 245 and is rejected by bus 215 when master 260 attempts to issue the transaction request, bus bridge 200 can reorder the read transaction request within queue 245. More particularly, when the master 260 indicates that a read transaction request that is directed to a restricted address is rejected (unsuccessfully issued), e.g., master 260 receives a re-arbitrate signal, master 260 can signal queue 245 to reorder one or more of the transaction requests stored therein.

For example, the read transaction request at the bottom of queue 245 that was rejected can be moved back at least one position within queue 245. In one embodiment, the rejected read transaction request can be moved to the top of queue 245, placing the rejected read transaction request "last" in line within queue 245. This can occur, for example, when signal 282 indicates a transaction request directed to a restricted address exists at the bottom of queue 245 and signal 296 from master 260 indicates that the transaction request at the bottom of queue 245 was rejected by bus 215. Though not shown, queue 245 can receive these signals and reorder the transaction requests stored therein responsive to the conditions described.

Because bus bridge 200 generally does not permit any other transaction request directed to the restricted address range to enter queue 245, the transaction ordering rules of PLB buses 205, 210, and 215, coupled through bus bridge 200, are not violated by the reordering of the rejected read transaction request. By allowing bus bridge 200 to reorder the rejected read transaction request within queue 245, the condition that caused PCI bridge 230 to reject the read transaction request on bus 215 can be resolved and the deadlock scenario described in relation to PCI bridge 230 can be avoided. When the rejected read transaction request is reordered, flip-flop 280 remains set as the rejected read transaction request is still stored within queue 245. Flip-flop 280 can remain set until such time that the reordered read transaction request is successfully issued, e.g., output, from master 260 onto bus 215.

In some cases, depending upon the particular transaction ordering rules of the buses coupled to bus bridge 200, when a read transaction request to a restricted address is permitted to enter queue 245, bus bridge 200 may prevent any subsequent write transaction request from the same master as the master that issued the queued read transaction request to the restricted address from entering queue 245. If not, a read transaction request followed by a write transaction request to the restricted address space, if reordered, can result in the two transaction requests being completed out of order, thereby violating transaction ordering rules for a bus such as PLB. Bus bridge 200 may, however, allow the same master to issue subsequent write transaction requests directed to addresses outside of the restricted address range, e.g., non-restricted addresses, while a read transaction request to a restricted address exists within queue 245.

In other cases, when a read transaction request directed to a restricted address is stored within queue 245, bus bridge 200 can prevent the entry of all read transaction requests by the same master that issued the queued read transaction request to the restricted address. Were bus bridge 200 to permit entry of such read transaction requests, a read transaction request directed to an unrestricted address that follows a read transaction request directed to a restricted address may be returned out of order if the read transaction request to the restricted address is re-ordered within queue 245, resulting in a violation of the transaction ordering rules for particular buses such as PLB.

It should be appreciated that to implement the different embodiments described, where the entry of a particular transaction request into queue 245 is predicated upon the identity of the master that issued the request and/or the type of request, e.g., a read transaction request or a write transaction request, that further comparators can be included within pipeline controller 250. By including such comparators and appropriate signals to monitor the identity of the issuing master and the type of command being issued, the comparators can output signals to be combined with signals 272, 274, and 288, to influence signals 290 and 292.

For example, each of comparators 266, 268, and/or 270 can represent a plurality of comparators. Comparator 266 can represent two or more comparators, where a first comparator checks addresses and a second comparator checks the command of each transaction request received by slave 235 through signals 232 and 242 respectively. An optional third comparator can be included that checks ID of each transaction request received by slave 235. The same can be true of comparator 268 for slave 240. Similarly, comparator 270 can represent two or more comparators, where a first comparator checks addresses and a second comparator checks the command of each transaction request received by slave 240 via signals 238 and 248 respectively. An optional third comparator can be included that checks ID of each transaction request received by slave 240. Comparator 270 also can represent a plurality of comparators, e.g., first address comparator, second command comparator, and/or an ID comparator, to evaluate transaction requests to be sent to the master 260. If such comparators are included, then additional signal lines providing the command and/or ID from each transaction request can be included and coupled to the appropriate comparators as indicated. In this manner, slaves 235 and 240 can be made to reject particular received transaction requests based upon any combination of the address to which the transaction request is directed, whether transaction request is a read or a write, and the identity of the master that issued the transaction request.

Figure 3:
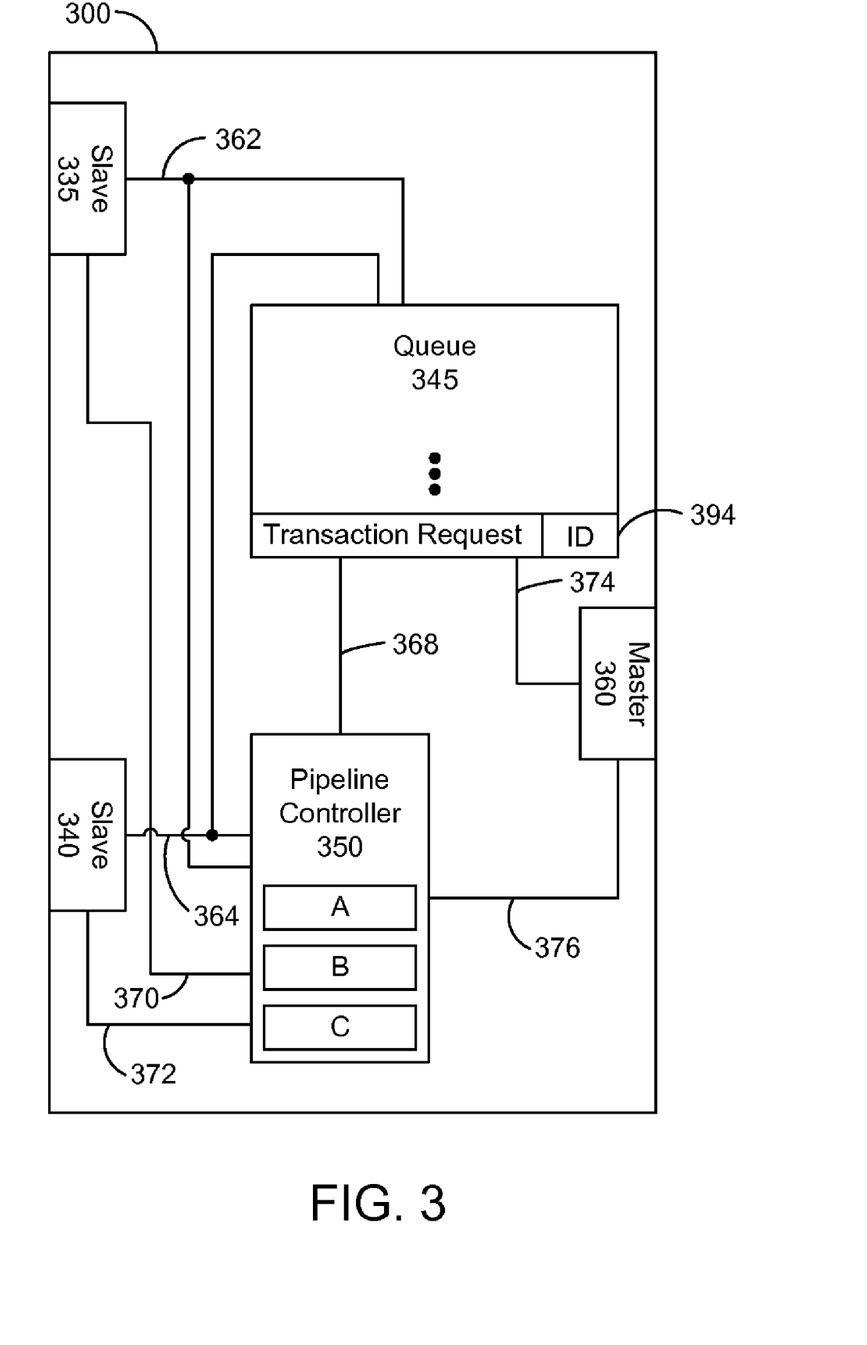
FIG. 3 is a third block diagram illustrating a bus bridge in accordance with another embodiment of the present invention.

FIG. 3 is a third block diagram illustrating a bus bridge 300 in accordance with another embodiment of the present invention. Bus bridge 300 can operate in a substantially similar manner as the bus bridge described with reference to FIGS. 1 and 2. As such, bus bridge 300 can include a slave 335, a slave 340, a queue 345, a pipeline controller 350, and a master 360. Slave 335 and slave 340 can be instructed to selectively reject received transaction requests via signals 370 and 372 respectively. When permitted, slave 335 and slave 340 can store transaction requests within queue 345 via signals 362 and 364 respectively. Pipeline controller 350 can communicate with master 360 via signal 376 and with queue 345 via signal 368.

In accordance with another embodiment, pipeline controller 350 can include a plurality of different sections, represented as A, B, and C. Each of sections A, B, and C can include a flag such as a flip-flop with corresponding enable and disable circuitry capable of identifying the address of requested transaction requests and an identifier, e.g., an ID, that indicates the particular master that issued the transaction request. Each section further can include circuitry for independently issuing control signals to each respective slave 335 and 340 whether that slave should accept or reject received transactions for a given master. More particularly, section A can be devoted to tracking transaction requests for a given master, e.g., master A. Section B can be devoted to tracking transaction requests for a given master, e.g., master B, etc. In this way, each respective section A, B, and C of pipeline controller 350 can determine and issue the control signal to the relevant slave 335 and/or 340 that indicates whether the slave should store the received transaction request within queue 345 or reject the received transaction request.

By the same token, each respective section A, B, and C, can independently clear the flag contained therein. For example, when a read transaction request directed to a restricted address range from master A is removed from the queue 345 due to a successful issuance of that transaction request from master 360 onto the bus coupled thereto, the flag within section A can be cleared. The same can be true with regard to sections B and C relating to transaction requests directed to restricted addresses issued from master B and master C respectively.

To facilitate this functionality, queue 345 can include a portion devoted to storing the ID for the master that issued the transaction request. Thus, each transaction request stored within the queue 345, as an entry, can include a master ID, or an ID field 394, that specifies the particular master that issued that transaction request. For example, ID field 394 can indicate an ID for a particular processor, a PCI bridge, or any other master that may be coupled to bus bridge 300. ID field 394 of a transaction request can be used to clear the flag of the appropriate section A, B, or C when given transaction request is output from master 360. That is, the value of the ID field, which is conveyed to pipeline controller 350 as a portion of signal 368, combined with successful issuance of the transaction request by master 360, as indicated by signal 376, can cause the appropriate flag to be cleared.

Accordingly, while the flag for a given master ID, e.g., A, is set, slaves 335 and 340 will reject all read transaction requests received from master A and also reject any write transaction requests directed to a restricted address from master A, if necessary to adhere to transaction ordering rules specific to the bus protocols of the buses connected to the bus bridge 300.

Figure 4:
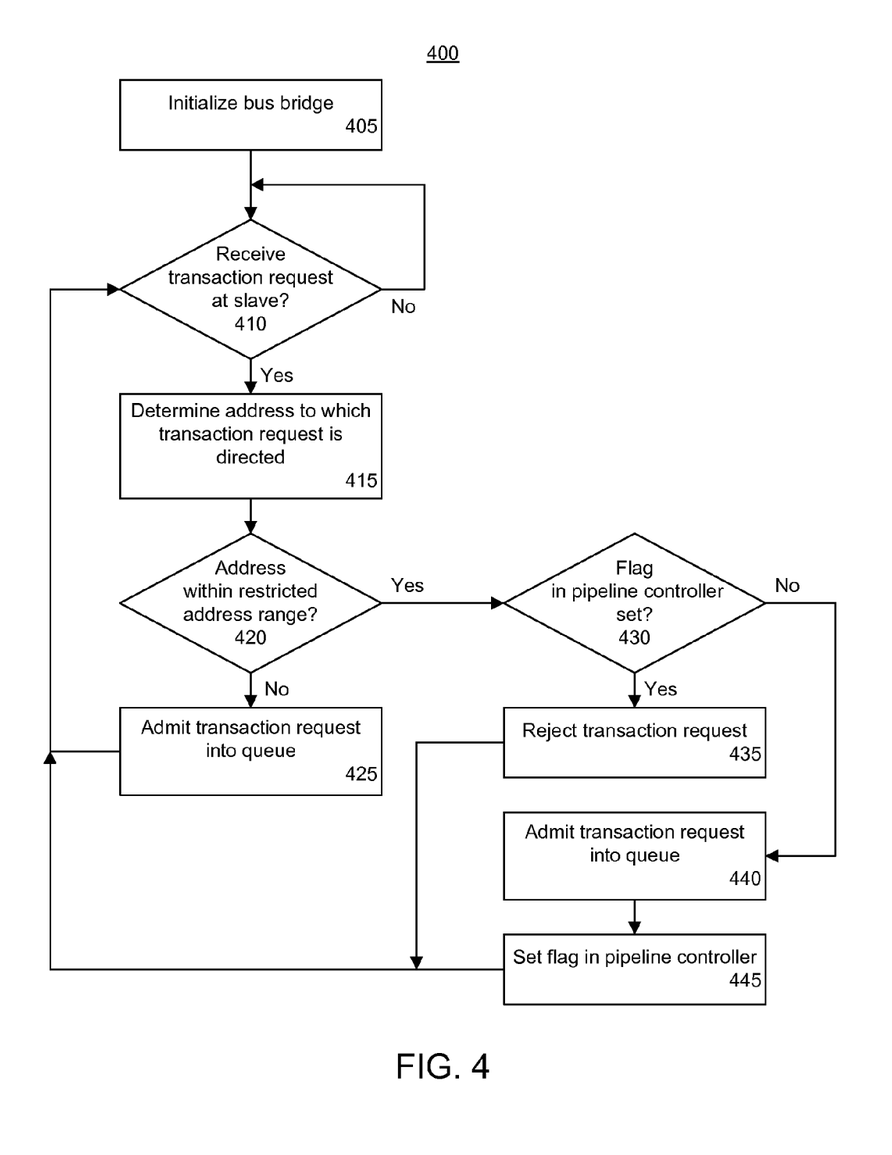
FIG. 4 is a flow chart illustrating a method of bridging a plurality of buses in accordance with another embodiment of the present invention.

FIG. 4 is a flow chart illustrating a method 400 of bridging a plurality of buses in accordance with another embodiment of the present invention. More particularly, method 400 illustrates a technique for controlling which transactions received at a slave of the bus bridge will be permitted to enter the bus bridge and be queued. FIG. 4 can be implemented, e.g., by a bus bridge, as described with reference to FIGS. 1-3, that interconnects a plurality of different buses. A range of addresses of devices accessible by one or more of the different interconnected buses can be designated as restricted. By selectively admitting transaction requests directed to the restricted address range into the queue of the bus bridge, the bus bridge can reorder the transaction requests stored within the queue without violating transaction ordering rules of the interconnected buses or peripherals.

Method 400 can begin in step 405 where the bus bridge can be initialized. For example, the flag within the pipeline controller can be initialized, e.g., cleared, along with the queue within the bus bridge. In step 410, the bus bridge can determine whether a transaction request has been received at one or more of the slaves. If not, method 400 can loop back to continue checking for received transaction requests. If a transaction request is received, method 400 can continue to step 415.

In step 415, the bus bridge can determine the address to which the transaction request is directed. In step 420, the bus bridge can determine whether the address determined in step 415 is within the restricted address range. If so, method 400 can continue to step 430. If not, method 400 can proceed to step 425. In step 425, since the received transaction is not directed to an address within the restricted address range, the transaction request can be admitted to, e.g., stored within, the queue. For example, the slave that received the transaction request can store the transaction request in the queue and issue an acknowledgement over the bus connected to that slave indicating that the transaction request was accepted. After step 425, method 400 can loop back to step 410 to continue processing.

Continuing with step 430, the bus bridge can determine whether the flag within the pipeline controller is set. If so, method 400 can proceed to step 435. When the flag within the pipeline controller is set, a transaction request that is directed to an address within the restricted address range exists, e.g., is stored within the queue. Accordingly, further transaction requests directed to a restricted address can be rejected. In step 435, the bus bridge can reject the transaction request. More particularly, the slave that received the transaction request can reject the transaction, e.g., issue a re-arbitrate in the case of a PLB. Accordingly, the transaction request is not stored within the queue. After step 435, method 400 can loop back to step 410.

When the flag within the pipeline controller is not set, then the queue does not include any transaction request directed to a restricted address. Accordingly, in step 440, the transaction request can be admitted into the queue. In that case, the slave can store the transaction request into the queue and issue an acknowledgement over the connected bus. In step 445, the flag within the pipeline controller can be set indicating that a transaction request to a restricted address is stored within the queue. After step 445, method 400 can loop back to step 410 to continue processing.

It should be appreciated that while method 400 is described in general terms, more specific acceptance and/or rejection criteria may be applied to each received transaction. For example, the bus bridge can reject any transaction request directed to a restricted address only when a read transaction request directed to a restricted address is already queued, reject any write transaction request to a restricted address that is from a same master as the master that issued a queued read transaction request to a restricted address, or allow a write transaction request to an unrestricted address that is from a same master as the master that issued a queued read transaction request to a restricted address. Other examples of bus bridge actions can include rejecting all reads to any address by the same master as the master that issued a queued read transaction request to a restricted address and accepting one or more write transaction requests to unrestricted addresses from a same master as the master that issued a queued read transaction request to a restricted address.

Figure 5:
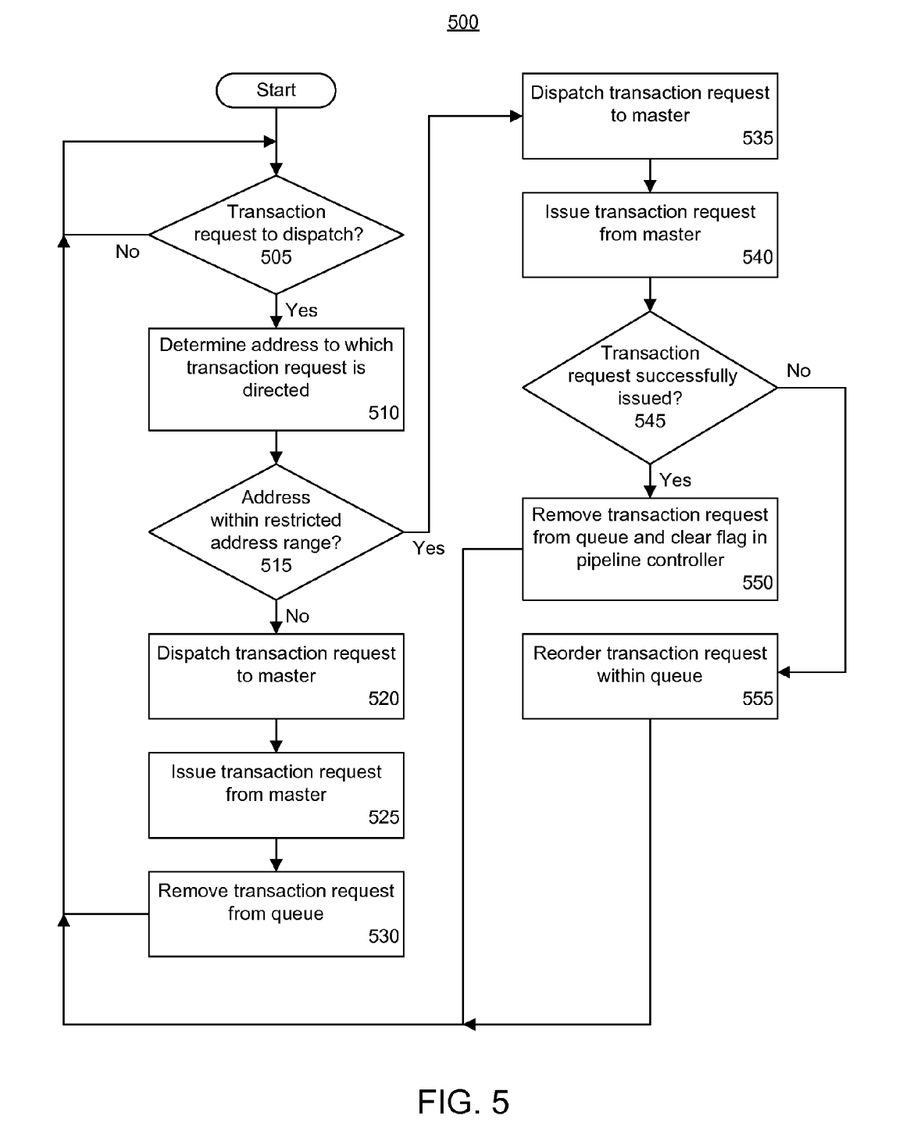
FIG. 5 is a flow chart illustrating a method of bridging a plurality of buses in accordance with another embodiment of the present invention.

FIG. 5 is a flow chart illustrating a method 500 of bridging a plurality of buses in accordance with another embodiment of the present invention. More particularly, method 500 illustrates a technique for determining when to reorder the queue of the bus bridge. Method 500 of FIG. 5 can be implemented by, e.g., a bus bridge, as described with reference to FIGS. 1-4, that interconnects a plurality of different buses. It should be appreciated that method 500 can, e.g., function cooperatively, and concurrently, with the method described with reference to FIG. 4.

Method 500 can begin in step 505 where the bus bridge can determine whether a transaction request exists at the head of the queue to be dispatched to the master. If so, method 500 can continue to step 510. If not, method 500 can loop back to continue monitoring for the existence of a transaction request within the queue to dispatch. In step 510, when a transaction request is available to be dispatched, the bus bridge can determine the address to which the transaction request is directed. In step 515, the bus bridge can determine whether the address is within the restricted address range. If so, method 500 can proceed to step 535. If not, method 500 can continue to step 520.

In step 520, when the transaction request is directed to an unrestricted address, the transaction request can be dispatched to the master. In step 525, the transaction request can be issued from the master. Though not illustrated in FIG. 5, when the transaction request is rejected by the bus connected to the master, the master will continue to attempt to issue the transaction request. The transaction request is not reordered within the queue. When the transaction request is successfully issued, in step 530, the transaction request can be removed from the queue to allow a next transaction request to be dispatched. After step 530, method 500 can loop back to step 505 to continue processing transaction requests.

In step 535, when the address to which the transaction request to be dispatched is within the restricted address range, the transaction request can be dispatched to the master. In step 540, the master can issue the transaction request on the bus connected to the master. In step 545, the bus bridge can determine whether the transaction request was successfully issued, e.g., whether the transaction request was accepted by the bus. If so, method 500 can continue to step 550. If not, method 500 can proceed to step 555.

Continuing with step 550, when the transaction request is successfully issued from the master, the transaction request can be removed from the queue of the bus bridge. Further, the flag within the pipeline controller can be cleared to indicate that no further transaction request, or read transaction request directed to a restricted address range, exists in the queue. After step 550, method 500 can proceed to step 505 to continue processing.

In step 555, when the transaction request is not successfully issued from the master, e.g., the bus rejects the transaction request, the master can communicate with the queue and cause the queue to reorder the transaction request within the queue. Due to the restrictions applied when admitting transaction requests into the queue, the rejected transaction request can be reordered within the queue without violating any transaction ordering rules of attached buses or peripherals. While the rejected transaction request can be moved to another position within the queue so that at least one other transaction request is placed ahead of the rejected transaction for dispatch to the master, in one embodiment, the blocked transaction request can be moved to the end of the queue, e.g., behind each other transaction request existing in the queue in terms of time to dispatch. After step 555, method 500 can loop back to step 505 to continue processing.

The bus bridge described in the specification can be implemented, e.g., within an IC, such as a programmable IC using the programmable fabric of the device. By restricting those transaction requests that are permitted to enter the queue of the bus bridge, transaction requests can be reordered within the queue without violating ordering rules of buses or peripherals connected, or coupled, to the bus bridge. The embodiments can be implemented using limited resources as compared to other bus bridge implementations that do not restrict transaction request entry into the queue in favor of utilizing more complex logic to reorder transactions within the bus bridge while observing transaction ordering rules of buses and peripherals.

It should be appreciated that the embodiments disclosed within this specification can be implemented within any of a variety of different types of ICs, whether custom ICs, application specific integrated circuits (ASICs), mixed signal ICs, or programmable ICs. Programmable ICs are a type of IC that can be programmed to perform specified logic functions. Examples of programmable ICs, can include, field programmable gate arrays (FPGAs), Complex Programmable Logic Devices (CPLDs), Programmable Logic Arrays (PLAs), and Programmable Array Logic (PAL) devices.

Within these devices, the functionality of the device can be controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell. Other examples of programmable ICs can include those programmed by applying a processing layer, such as a metal layer, that programmably interconnects the various elements on the device. These programmable ICs are known as mask programmable devices. Programmable ICs can also be implemented in other ways, e.g., using fuse or antifuse technology.

The phrase "programmable IC," as used within this specification, can include, but is not limited to, these devices, as well as encompass devices that are only partially programmable. For example, one type of programmable IC can include a combination of hard-coded transistor logic and a programmable switch fabric that programmably interconnects the hard-coded transistor logic.

The flowcharts in the figures illustrate the architecture, functionality, and operation of possible implementations of circuits, systems, methods, and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. Any kind of data processing system or other apparatus adapted for carrying out the methods described herein is suited. A typical combination of hardware and software can be a general-purpose computer with a computer program that, when being loaded and executed, controls the computer such that it carries out the methods described herein or instantiates a circuit design specified in programmatic form within an IC, whether programmable or not.

A "computer," e.g., a data processing system or a computer system, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

Embodiments of the present invention further can be embedded in a computer program product, which comprises all the features enabling the implementation of the methods described herein. The computer program product can include a computer-usable or computer-readable medium having computer-usable program code which, when loaded in a computer system, specifies, or causes the computer system to generate, a programmatic description of the circuits and/or systems described herein. Examples of computer-usable or computer-readable media can include, but are not limited to, optical media, magnetic media, computer memory, or the like.

For example, the embodiments disclosed within this specification may be implemented as one or more intellectual property (IP) cores that may be available for use within larger system. An IP core can include a predetermined set of configuration bits that program a programmable IC to perform one or more functions. Alternatively, an IP core can include source code or schematics that describe the logic and connectivity of a design. Some cores include an optimally floorplanned layout targeted to a specific family of programmable ICs. IP cores can also be parameterizable, i.e., allowing the user to enter parameters to activate or change certain core functionality.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library, a netlist, an IP core, a hardware description language specification of a system, a bitstream, and/or other sequence of instructions designed for execution on a computer system or which programs an IC, or implements within an IC, the embodiments described within this specification.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open-ended language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of bridging a plurality of buses within a bus bridge, the method comprising:
   determining whether a queue of the bus bridge comprises a transaction request directed to a restricted address range;
   designating each address corresponding to a peripheral coupled to the bus bridge that has a reordering rule as belonging to the restricted address range;
   for each received transaction request, determining whether an address to which the transaction request is directed is within the restricted address range; and
   selectively rejecting each transaction request received by the bus bridge according to whether the address to which the transaction request is directed is within the restricted address range and whether the queue comprises a transaction request directed to the restricted address range.

2. The method of claim 1, further comprising, responsive to issuing a transaction request from the bus bridge directed to an address within the restricted address range, reordering the transaction request within the queue when the transaction request is rejected.

3. The method of claim 1, wherein selectively rejecting each transaction request received by the bus bridge comprises rejecting the transaction request by issuing a re-arbitrate signal when the address to which the transaction request is directed is within the restricted address range and the queue comprises a transaction request directed to the restricted address range.

4. The method of claim 1, further comprising, responsive to issuing a transaction request that is not directed to an address within the restricted address range and that is rejected, continuing to attempt to issue the transaction request, wherein the transaction request is maintained within the queue while ordering of transaction requests is preserved.

5. The method of claim 1, further comprising:
   when the queue comprises a read transaction request directed to an address in the restricted address range, rejecting another read transaction request from a same master as the read transaction request directed to the restricted address.

6. The method of claim 5, further comprising:
   accepting a write transaction request directed to an unrestricted address from the same master as the read transaction request directed to the restricted address while the read transaction request directed to the restricted address is within the queue.

7. A bus bridge comprising:
   a queue storing transaction requests;
   a pipeline controller indicating whether the queue comprises a transaction request directed to a restricted address range and determining, for each received transaction request, whether an address to which the transaction request is directed is within the restricted address range; and
   at least one slave interface selectively rejecting each transaction request received by the bus bridge according to whether the address to which the transaction request is directed is within the restricted address range and whether the queue comprises a transaction request directed to the restricted address range, wherein each address corresponding to a peripheral coupled to the bus bridge that has a reordering rule is designated as belonging to the restricted address range.

8. The bus bridge of claim 7, wherein the transaction request that is directed to an address within the restricted address range is maintained in the queue and at least one other transaction request is placed ahead of the transaction request when the transaction request is rejected when issued from the bus bridge, and wherein the transaction request is selected for reordering according to the address to which the transaction request is directed.

9. The bus bridge of claim 7, wherein the at least one slave interface rejects the transaction request by issuing a re-arbitrate signal when the address to which the transaction request is directed is within the restricted address range and the queue comprises a transaction request directed to the restricted address range.

10. The bus bridge of claim 7, further comprising a master interface that, responsive to attempting to issue a transaction request that is not directed to an address within the restricted address range and that is rejected, continues to attempt to issue the transaction request, wherein the transaction request is maintained within the queue while ordering of transaction requests stored within the queue is preserved.

11. The bus bridge of claim 7, wherein responsive to determining that the queue comprises a read transaction request directed to an address in the restricted address range, the at least one slave interface rejects another read transaction request from a same master as the read transaction request directed to the restricted address.

12. The bus bridge of claim 11, wherein the at least one slave interface further accepts a write transaction request directed to an unrestricted address from the same master as the read transaction request directed to the restricted address while the read transaction request directed to the restricted address is within the queue.

13. A computer program product comprising:
 a non-transitory computer-usable medium comprising computer-usable program code that, when executed by a computer, implements a bus bridge for a programmable integrated circuit, the computer-usable medium comprising:
 computer-usable program code that implements a queue storing transaction requests;
 computer-usable program code that implements a pipeline controller indicating whether the queue comprises a transaction request directed to a restricted address range and determining, for each received transaction request, whether an address to which the transaction request is directed is within the restricted address range; and
 computer-usable program code that implements at least one slave interface selectively rejecting each transaction request received by the bus bridge according to whether the address to which the transaction request is directed is within the restricted address range and whether the queue comprises a transaction request directed to the restricted address range,
 wherein each address corresponding to a peripheral coupled to the bus bridge that has a reordering rule is designated as belonging to the restricted address range.

14. The computer-program product of claim 13, wherein the bus bridge maintains the transaction request in the queue and at least one other transaction request is placed ahead of the transaction request when the transaction request is rejected when issued from the bus bridge.

15. The computer program product of claim 13, wherein the computer-usable medium further comprises computer usable program code that implements the at least one slave interface to reject the transaction request by issuing a re-arbitrate signal when the address to which the transaction request is directed is within the restricted address range and the queue comprises a transaction request directed to the restricted address range.

16. The computer program product of claim 13, wherein the computer-usable medium further comprises computer-usable program code that implements a master interface that, responsive to attempting to issue a transaction request that is not directed to an address within the restricted address range and that is rejected, continues to attempt to issue the transaction request, wherein the transaction request is maintained within the queue while ordering of transaction requests stored within the queue is preserved.

17. The computer program product of claim 13, wherein responsive to determining that the queue comprises a read transaction request directed to an address in the restricted address range, the at least one slave interface rejects another read transaction request from a same master as the read transaction request directed to the restricted address.

18. The computer program product of claim 17, wherein at least one slave interface accepts a write transaction request directed to an unrestricted address from the same master as the read transaction request directed to the restricted address while the read transaction request directed to the restricted address is within the queue.

* * * * *